US012678819B2

(12) United States Patent
Schnur et al.

(10) Patent No.: US 12,678,819 B2
(45) Date of Patent: Jul. 14, 2026

(54) APPLICATION DEVICE FOR PREFERABLY PARTIALLY BOOSTED APPLICATION

(71) Applicant: Dürr Systems AG, Bietigheim-Bissingen (DE)

(72) Inventors: Frank Schnur, Bönningheim (DE); Carsten Schulz, Leingarten (DE); Bernd Locher, Knittlingen (DE); Lothar Rademacher, Bietigheim-Bissingen (DE)

(*) Notice: Subject to any disclaimer, the term of this patent is extended or adjusted under 35 U.S.C. 154(b) by 272 days.

(21) Appl. No.: 18/249,743

(22) PCT Filed: Oct. 19, 2021

(86) PCT No.: PCT/EP2021/078948
§ 371 (c)(1),
(2) Date: Apr. 20, 2023

(87) PCT Pub. No.: WO2022/089996
PCT Pub. Date: May 5, 2022

(65) Prior Publication Data

US 2023/0381808 A1 Nov. 30, 2023

(30) Foreign Application Priority Data

Oct. 26, 2020 (DE) ..................... 10 2020 128 115.3

(51) Int. Cl.
*B05C 11/10* (2006.01)
*B05C 5/02* (2006.01)
*B05C 17/005* (2006.01)

(52) U.S. Cl.
CPC ........ *B05C 11/1036* (2013.01); *B05C 5/0275* (2013.01); *B05C 17/00566* (2013.01)

(58) Field of Classification Search
CPC ... B29B 7/603; B29B 7/726; B05C 17/00516; B05C 17/00566; B05C 5/0225; B05C 5/0275; B05C 11/1013; B05C 11/1036
(Continued)

(56) References Cited

U.S. PATENT DOCUMENTS 4,037,758 A * 7/1977 Bourque ............... B29B 7/7471 222/134
4,204,977 A * 5/1980 Zwirlein ............... B29B 7/7404 239/413

(Continued)

FOREIGN PATENT DOCUMENTS

CN 1549749 A 11/2004
CN 1902009 A 1/2007

(Continued)

OTHER PUBLICATIONS

Office Action from German Patent Office in related application DE10 2020 128 115.3 mailed Jul. 23, 2021 (14 pages; with English machine translation).

(Continued)

*Primary Examiner* — Charles P. Cheyney
(74) *Attorney, Agent, or Firm* — Taft Stettinius & Hollister LLP; Thomas E. Bejin; John W. Carpenter

(57) ABSTRACT

The disclosure relates to an application device, preferably for alternately applying a 2C material, comprising a first component material and a second component material, on the one hand and the first component material on the other hand, in particular onto a motor vehicle component, comprising preferably an application head and a first line section leading to an application nozzle, wherein the first line section comprises a mixer and a first line for a first component material and a second line for a second component material, wherein the first line and the second line are connected to the mixer and the mixer mixes the first com- (Continued)

ponent material and the second component material with each other for forming a 2C material. The application device is characterized in particular in that it comprises a second line section for the first component material to form an application bead of alternately the 2C material from the first line section and the first component material from the second line section.

28 Claims, 6 Drawing Sheets

(58) Field of Classification Search
USPC .................................. 222/135, 145.6, 145.2
See application file for complete search history.

(56) References Cited

U.S. PATENT DOCUMENTS

| | | | | | |
|---|---|---|---|---|---|
| 4,302,481 | A * | 11/1981 | Ribnitz | B05B 12/14 239/3 |
| 4,407,431 | A * | 10/1983 | Hutter, III | B29B 7/7476 239/113 |
| 4,776,704 | A * | 10/1988 | Kopunek | B01F 33/5011 222/386 |
| 4,961,795 | A * | 10/1990 | Detlefsen | C08L 61/06 156/335 |
| 5,200,267 | A * | 4/1993 | Bauer | B27N 1/02 428/326 |
| 5,271,521 | A * | 12/1993 | Noss | B29B 7/826 222/146.2 |
| 5,499,745 | A * | 3/1996 | Derian | B05C 11/10 222/145.6 |
| 5,857,589 | A * | 1/1999 | Cline | B05C 11/1005 222/63 |
| 5,992,686 | A * | 11/1999 | Cline | B29B 7/94 222/63 |
| 6,105,822 | A * | 8/2000 | Larsen | B29B 7/7414 222/134 |
| 6,698,617 | B1 * | 3/2004 | Szymanski | B05B 15/65 137/15.01 |
| 7,918,369 | B2 * | 4/2011 | Kosmyna | B05B 7/2481 222/145.5 |
| 9,242,267 | B2 * | 1/2016 | O'Leary | B29B 7/7409 |
| 11,794,203 | B2 * | 10/2023 | Gormanns | B05C 11/1013 |
| 2002/0104900 | A1 * | 8/2002 | Borcea | B05B 13/0627 239/548 |
| 2004/0085854 | A1 * | 5/2004 | Pauser | B01F 27/05 222/145.6 |
| 2019/0232330 | A1 * | 8/2019 | Burock | B05C 11/1047 |

FOREIGN PATENT DOCUMENTS

| | | | |
|---|---|---|---|
| CN | 202860775 | U | 4/2013 |
| CN | 111565830 | A | 8/2020 |
| DE | 19852079 | A1 | 5/2000 |
| DE | 102004033223 | B3 | 11/2005 |
| DE | 60121409 | T2 | 7/2007 |
| DE | 102010019771 | A1 | 11/2011 |
| DE | 102012206418 | A1 | 10/2013 |
| DE | 102014017856 | A1 | 6/2016 |
| DE | 102018119838 | A1 | 2/2020 |
| DE | 102019130612 | A1 | 5/2021 |
| EP | 1245296 | A1 | 10/2002 |
| EP | 2532444 | A1 | 12/2012 |
| EP | 3610941 | A1 | 2/2020 |
| JP | S62-163781 | A | 7/1987 |
| JP | H09-7509 | A | 1/1997 |
| JP | 2000516535 | A | 12/2000 |
| JP | 2013521110 | A | 6/2013 |
| JP | 2019063706 | A | 4/2019 |
| KR | 20100091809 | A | 8/2010 |
| WO | 2018050482 | A1 | 3/2018 |
| WO | 2020035228 | A1 | 2/2020 |
| WO | 2021152557 | A1 | 8/2021 |

OTHER PUBLICATIONS

International Search Report and Written Opinion mailed Feb. 14, 2022 for PCT/EP2021/078948 (14 pages; with English translation).
International Search Report and Written Opinion for PCT/EP2021/078131 mailed Jan. 31, 2022 (14 pages; with English translation).
Office Action from German Patent Office for related application No. DE 10 2020 128 118.8 mailed Feb. 25, 2021 (12 pages; with English machine translation).
German Patent Office Official Communication for related application No. DE 10 2020 128 118.8 mailed Mar. 9, 2021 (2 pages; with English machine translation).
Office Action from European Patent Office for related application No. 21 798 603.3-1009 mailed May 19, 2025 (10 pages; English translation unavailable).
Chinese Patent Office First Office Action and Search Report for related application No. 202180073339.2 mailed Aug. 26, 2025 (22 pages; with English translation).
Korean Patent Office Notice of Preliminary Rejection for related application No. 10-2023-7017900 mailed Oct. 30, 2025 (28 pages; with English translation).
Japanese Patent Office Notification of Reasons for Rejection for related application No. 2023-525056 mailed Sep. 30, 2025 (17 pages with English translation).
Chinese Patent Office Notice of Granting Patent Right for Invention for related application No. 202180073339.2 dated Mar. 26, 2026 (8 pages; with English machine translation).

* cited by examiner

A-A
B-B
A
B
30.1
30
90
20
10
3
71
72
73
4
100
80
4.1

APPLICATION DEVICE FOR PREFERABLY PARTIALLY BOOSTED APPLICATION

CROSS-REFERENCE TO RELATED APPLICATIONS

This application is a national stage of, and claims priority to, Patent Cooperation Treaty Application No. PCT/EP2021/078948, filed on Oct. 19, 2021, which application claims priority to German Application No. 10 2020 128 115.3, filed on Oct. 26, 2020, which applications are hereby incorporated herein by reference in their entireties.

FIELD

The disclosure relates to an application device, in particular for alternately applying a 2C material, comprising a first component material (e.g. an adhesive medium) and a second component material (e.g. a hardener medium), and the first component material (e.g. the adhesive medium) from, for example, an application nozzle. The application device is used in particular for application onto a motor vehicle component (e.g. a motor vehicle body and/or an add-on part therefor). The disclosure also relates to an associated operating method.

BACKGROUND

In the prior art, application devices for applying a two-component adhesive (2C adhesive) to form an adhesive bead are known in the most diverse embodiments. 2C adhesives typically comprise an adhesive medium (first component material) and a hardener medium (second component material) for hardening the adhesive medium. Before application, the adhesive medium and the hardener medium must be mixed in an adhesive-specific mixing ratio. Only if the mixture is sufficiently homogeneous during application can an adhesive bond with the desired properties be achieved.

To achieve such a mixture, the adhesive medium and the hardener medium are usually fed into a mixer. Here, a distinction is made between two different mixing methods, namely mixing with a dynamic mixer (dynamic mixing) and mixing with a static mixer (static mixing).

In dynamic mixing, the adhesive medium and the hardener medium are fed in the desired ratio to a mixing chamber of the mixer, wherein a mixing head, for example, rotates in the mixing chamber for mixing. Dynamic mixing is often used when, for example, the viscosities of the adhesive medium and the hardener medium are very different. Dynamic mixing is generally characterized by the fact that good mixing is achieved over a comparatively short mixer length. At the same time, dynamic mixing causes a relatively low pressure loss.

In static mixing, the adhesive medium and the hardener medium are fed to a static mixer. The static mixer usually contains an insert which enables the desired mixing by deflecting the adhesive medium and the hardener medium. The quality of the mixing depends in particular on the geometry and length of the insert. Due to its structure, a static mixer usually generates a comparatively high pressure loss.

However, dynamic mixers and static mixers have in common that the mixture of adhesive and hardener medium starts to harden in the mixer during a production stop. Depending on the adhesive-specific pot life, the mixer should therefore be flushed after an appropriate time has elapsed. This is usually done either by flushing with a flushing medium provided for this purpose, or by simply using the adhesive medium to press the mixture of adhesive and hardener medium out of the mixer. Depending on the volume of the mixer and the adhesive viscosity, a more or less large flushing quantity is required for this. The flushed material is usually discarded. Nevertheless, it can be assumed that a residual quantity of mixed adhesive and hardener medium still remains in the mixer.

For certain purposes, it can be desirable that the adhesive bead is not formed entirely or continuously from mixed 2C material, but alternately from the 2C material (mixed adhesive and hardener medium) on the one hand and only the adhesive medium, omitting the hardener medium, on the other hand. The change (switching) between an application of the 2C material and the pure adhesive medium is usually done such that when change to only the adhesive medium, the hardener medium is simply switched off, and at the same time the volume flow of the adhesive medium is increased so that a throughout constant volume flow is obtained. In this case, the pure adhesive medium must take the path through the mixer before it then exits the nozzle.

However, this results in particular in the following disadvantages:

- The change takes place with a relatively long and/or coarse time delay, because the mixture in the mixer must first be dispensed before the change can take effect. The greater the mixer volume, the greater the time delay.
- A transition-free change is not possible because "undefined" mixing ratios are initially established in the mixer during the change. Only when the mixture has been completely removed ("flushed") from the mixer, the change can be completed.

DETAILED DESCRIPTION

Figure 1:
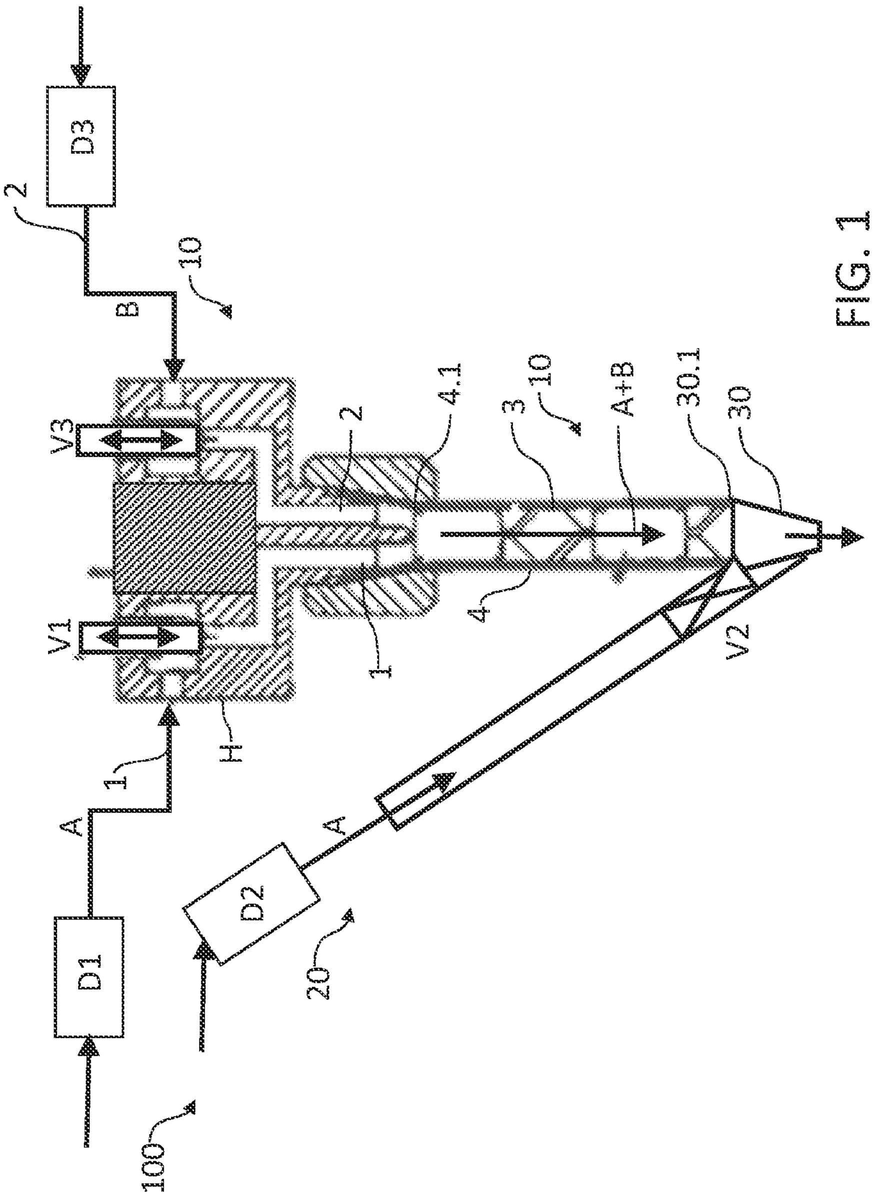
FIG. 1 shows an application device according to an exemplary embodiment of the disclosure.

The disclosure creates an alternative and/or improved application device, in particular an application device, with which an application of an application bead is made possible which, in an expedient alternation, on the one hand comprises a 2C material, comprising a first component material and a second component material, and on the other hand comprises expediently only the first component material, but with advantageously as small as possible, preferably essentially no undefined transition regions.

The disclosure relates to an application device, preferably for alternately applying a (particularly mixed) two component material (expediently 2C material), comprising a first component material (e.g. an adhesive medium, preferably resin) and a second component material (e.g. a hardener medium), and the first component material (e.g. the adhesive medium, preferably resin), preferably to a motor vehicle component (e.g. a motor vehicle body component and/or an add-on component therefor).

The application device can comprise, for example, an application head.

The application device comprises a first line section, which can preferably lead to an application nozzle. The first line section comprises a mixer and a first line for the first component material (e.g. an adhesive medium) and a second line for the second component material (e.g. a hardener medium). The first line and the second line are connected to the mixer, wherein the mixer is configured to form an expediently mixed 2C material and, in particular, to mix the first component material (e.g. the adhesive medium) and the second component material (e.g. the hardener medium).

The application device is characterized in particular in that it comprises (in particular in addition to the first line section) at least one second line section for the first component material (e.g. the adhesive medium), preferably in order to form an application bead of (e.g. indirectly or essentially directly) alternately the in particular mixed 2C material from the first line section and the first component material from the second line section.

The application head can have, for example, a first connection for the first line and/or a second connection for the second line, and alternatively or additionally, for example, a connection for the second line section.

It is possible that the second line section leads to the application nozzle. The mixed 2C material and the first component material can, for example, be dispensed from one and the same application nozzle, e.g. from expediently different and/or several outlet openings or one and the same outlet opening.

It is possible that the first line section and/or the second line section open into the application nozzle.

The application device advantageously allows in particular the mixed 2C material and the first component material to meet only in or as close as possible before the application nozzle.

It should be mentioned here that the first line and the second line section can expediently provide the same material (in particular the same adhesive medium), in particular can lead to the application nozzle.

The second line section for the first component material enables, in particular, application beads with as small as possible, preferably essentially no undefined transition regions between bead sections of (expediently mixed) 2C material and bead sections of (preferably only) the first component material, preferably because a mixture can remain in the mixer in the set, expediently desired mixing ratio.

In addition, very dynamic changes, for example, can be realized by means of the second line section for the first component material.

It is possible that the second line section forms, for example, a bypass line for bypassing the mixer and/or leads downstream of the mixer to the application nozzle, so that preferably the first component material of the second line section can be applied bypassing (expediently at least a major part of) the mixer.

It is possible that the application device is configured for (expediently indirectly or essentially directly) alternately applying the expediently mixed 2C material on the one hand and the first component material omitting the second component material on the other hand. Alternatively or additionally, the second line section can guide the first component material to the application nozzle, e.g. omitting the second component material.

In particular, the second line section can be used to apply the pure first component material and/or only the first component material.

The second line section can, for example, lead to the application nozzle, open into the application nozzle, and/or open substantially directly before the application nozzle, e.g., into the application tube mentioned below.

It is possible that the first line is connected to a (expediently first) metering device to meter the first component material for the first line. Alternatively or additionally, the second line section can comprise, for example, a (expediently second) metering device to meter the first component material for the second line section.

For example, the second line can be connected to a metering device to meter the second component material for the second line.

It is possible that a common metering device is provided to meter the first component material for the first line and the first component material for the second line section. In this case, therefore, the first line and the second line section can preferably be connected to a common metering device.

The first component material for the first line can, for example, be provided by a first material supply (e.g. a first tank for the first component material) and the first component material for the second line section can, for example, be provided by a second material supply (e.g. a second tank for the first component material).

However, it is also possible that the first component material for the first line and the first component material for the second line section are provided by a common material supply (e.g. a common tank for the first component material).

It is possible that the mixer is configured as a static mixer or a dynamic mixer.

It is possible that the first line comprises a first preferably controllable valve (e.g. needle valve) for opening and closing the first line.

The second line can, for example, comprise a second preferably controllable valve (e.g. needle valve) for opening and closing the second line.

The first valve and/or the second valve can, for example, also permit in particular partial opening, so that expediently one or more intermediate positions between an open and a closed valve position can be advantageously realized.

The first valve and/or the second valve is preferably integrated in the application head.

The second line section can, for example, comprise at least one valve, preferably a non-return valve and/or a preferably controllable valve (e.g. needle valve) for expediently opening and closing of the second line section. The valve can, for example, be arranged outside or inside the application tube discussed further below.

The expediently controllable valve can, for example, also enable in particular partial opening, so that in particular one or more intermediate positions between an open and a closed valve position can be advantageously realized.

It is possible that the application device comprises, for example, an application tube or is an application tube. The application tube can, for example, be of single-tube or multi-tube structure.

The application tube can expediently be configured, for example, relatively long or relatively short, for example, as a tube stub.

Preferably, the application tube can be mounted (e.g. detachably) to the application head.

It is possible that the application tube comprises the application nozzle and/or the mixer is arranged in the application tube. For example, the mixer can be detachably or non-detachably arranged in the application tube.

The application nozzle can preferably be formed at the distal end of the application tube and/or downstream behind the mixer.

The second line section and/or the first line section can, for example, run through the application tube and preferably end in the application nozzle.

The second line section can, for example, extend (preferably substantially axially) along the mixer, be arranged parallel to the first line section and/or be arranged coaxially with the first line section.

It is possible that the second line section preferably extends in the application tube (expediently radially) inside the mixer.

The mixer can, expediently on the inside, comprise a hollow channel for the second line section and/or a valve needle (and be configured, for example, as a (expediently static or dynamic) hollow shaft).

The second line section can, for example, extend between the mixer and the valve needle.

It is possible that the second line section preferably extends in the application tube (expediently radially) outside the mixer.

The mixer can be covered, e.g., externally by at least one tube, wherein the second line section can preferably extend between the mixer and the tube.

It is possible that the application tube comprises a rotary closure and preferably the first line section and/or the second line section can be closed or opened by the rotary closure. The rotary closure can, for example, also enable in particular partial opening, so that in particular one or more intermediate positions between an open position and a closed position can be advantageously realized.

In the context of the disclosure, the application tube can, for example, comprise at least two tubes, e.g., comprise at least two tubes extending coaxially to each other and/or at least two tubes inserted into each other.

The mixer can, for example, be arranged in a tube (expediently detachable or non-detachable), wherein the tube can, for example, be covered on the outside by a tube, in particular a protective tube.

The protective tube can, for example, be covered externally by a preferably rotatable tube.

The application tube can, for example, comprise at least two tubes between which the second line section can be formed. Alternatively or additionally, the application tube can, for example, comprise at least two tubes, one tube of which, in particular, is rotatable to open or close the first line section and/or the second line section and thus preferably to form a rotary closure. Preferably, e.g. an outer tube can be rotatable relative to an inner tube to open or close the first line section and/or the second line section and thus preferably to form a rotary closure.

The rotary closure can, for example within the application tube, open or close the first line section and/or the second line section.

The rotary closure can be arranged e.g. in the outlet-sided end section of the application tube, e.g. in the outlet-sided quarter, fifth or sixth of the application tube, preferably substantially directly before or in the application nozzle.

It is possible that a valve needle is arranged in the application tube, e.g. running coaxially to the application tube, in particular a switchable valve needle. The valve needle can extend e.g. into the outlet-sided end section of the application tube, e.g. into the outlet-sided quarter, fifth or sixth of the application tube, preferably at least substantially directly before or in the application nozzle.

The first line section and/or the second line section can be opened or closed, for example, by the valve needle.

The valve needle can be switched, for example, via the application head, in particular to open or close the first line section and/or the second line section.

At least one bearing location for the valve needle can be arranged in the application tube and/or in the hollow channel of the mixer, wherein the second line section can be guided through the at least one bearing location. Thus, for example, the first component material for the second line section can flow through one or more openings in the at least one bearing location through the at least one bearing location.

It is possible that, e.g. in the application tube, the first line section and the second line section are separated from each other by a double wall, in particular an insulating wall. The double wall preferably forms an insulating intermediate space between the first line section and the second line section. This can make it possible, for example, that an exothermic reaction in the first line section (e.g. between the first component material and the second component material) has no effect, or only a mitigated effect, on the first component material in the second line section.

It is possible that the first line and/or the second line runs expediently partially in the application head, in particular is integrated in the application head.

Alternatively or additionally, the second line section can, for example, be expediently externally routed past the application head or can expediently partially run in the application head, in particular be integrated in the application head.

It is possible that the first line section (e.g. the first line and/or the second line) leads into the application tube via an, in particular inlet-sided, front side of the application tube. Alternatively or additionally, the second line section can also lead into the application tube, e.g., via the, in particular inlet-sided, front side of the application tube.

However, it is also possible that the second line section leads into the application tube via a lateral surface of the application tube and thus preferably laterally from the outside (e.g. obliquely or orthogonally) or leads into the application nozzle via a lateral surface of the application nozzle and thus preferably laterally from the outside (e.g. obliquely or orthogonally).

The second line section can, for example, connect obliquely and/or laterally to the application nozzle and/or the application tube (e.g. the lateral surface thereof) and thus preferably not coaxially.

The first line section and/or the second line section can, for example, lead into the application nozzle via a front side of the application nozzle, in particular can open in the application nozzle.

It is possible that the application nozzle, the mixer and/or the application tube are aligned substantially coaxially with one another.

The first component material can preferably be an adhesive medium and the second component material can preferably be a hardener medium, in particular for hardening the adhesive medium.

The first line is preferably an adhesive medium line.

The second line section is preferably an adhesive medium line section.

The second line is preferably a hardener medium line.

The application bead can preferably be an adhesive bead.

It is possible that the application head is preferably mounted on a multi-axis articulated arm robot, for example on a multi-axis robot hand.

The application tube can, for example, be constructed from a single tube or be constructed from multiple tubes, e.g., from at least two tubes extending coaxially to each other and/or at least two tubes inserted into each other.

The application nozzle is preferably arranged downstream of the mixer and/or can, for example, comprise at least one outlet opening.

The application nozzle can, for example, have a flow cross-section along its flow direction that is essentially constant or that tapers (e.g. conically) towards its outlet opening.

The application nozzle can, for example, be a one-piece integral part of the application tube or be expediently mounted on the application tube.

The mixer can, for example, comprise an external mixer contour for the first line section and/or an internal hollow channel for the second line section.

The mixer can, for example, comprise at least one helical, screw-shaped, lamellar and/or lattice-shaped mixing element, which can extend along the application tube, for example.

The mixer can, for example, be formed as a tube (e.g. (expediently static or dynamic) hollow shaft) with an external mixer contour and/or an internal hollow channel for the second line section and/or the valve needle.

The disclosure can preferably be applied to 2C adhesives. However, it is not limited to 2C adhesives, but can also be applied to another 2C system. For example, the disclosure is in principle not limited to a particular adhesive system or to a 2C adhesive with a particular mixing ratio.

The application device can comprise, for example, a first hardening means for hardening application bead sections from the expediently mixed 2C material and/or comprise a second hardening means for hardening application bead sections from the first component material.

The second hardening means can preferably be arranged in the production line downstream of the first hardening means, so that hardening can be carried out first by means of the first hardening means and (expediently indirectly or directly) thereafter by means of the second hardening means.

The first hardening means is preferably configured for hardening by means of induction or infrared radiation. Alternatively or additionally, the second hardening means can comprise, for example, a hardening oven.

The disclosure also relates to an operating method for an application device, preferably an application device as disclosed herein.

The application device is preferably used for alternately applying a 2C material, comprising a first component material and a second component material, on the one hand and the first component material on the other hand (e.g. from an application nozzle, and in particular onto a motor vehicle component).

The application device comprises a first line section, e.g. leading to an application nozzle, wherein the first line section comprises a mixer and a first line for a first component material and a second line for a second component material. The first component material and the second component material are fed to the mixer, and the mixer mixes the first component material and the second component material with each other for forming a 2C material.

The operating method is characterized in particular in that a second line section is provided for the first component material to form an application bead of (e.g. indirectly or substantially directly) alternately the (expediently mixed) 2C material from the first line section and the first component material from the second line section.

In order to ensure a substantially continuous material flow (in particular from the application nozzle), e.g. during a switchover from a 2C material application to an application of the first material component, a metering of the 2C material from the first line section can be decreased and, e.g. simultaneously, a metering of the first material component from the second line section can be increased. This can preferably be done in reverse for a switchover from an application of the first material component to a 2C material application.

If the switchover is not required during the running application, for example, but is needed, for example, for a change from one application bead to the next application bead, the first material component for the first line section and the second line section can also be metered from one and the same metering device.

It should be mentioned again that the first component material for the first line and the first component material for the second line section are expediently the same material, e.g., the same adhesive medium.

It should be mentioned that in the context of the disclosure, exemplary embodiments are particularly encompassed in which the A component (in particular the first component material) and the mixed 2C material from the A component and a B component (in particular the first component material and the second component material) can be applied in alternation.

It should also be mentioned that, in addition to the second line section, the application device can comprise, for example, at least one further line section for a further material component. The further line section can lead to the application nozzle preferably bypassing the mixer. The further material component can, for example, be metered by an own metering device.

It should also be mentioned that the disclosure is preferably not limited to the sequence between bead sections from the 2C material and bead sections from the first component material.

It should also be mentioned that the adhesive medium is preferably resin.

The further line section can, for example, be constructed like the second line section, so that the corresponding disclosure mutatis mutandis expediently also applies to the further line section.

In particular, the application device enables a partially boosted application. This includes, in particular, an application in which the A component of a 2C material and the 2C material AB can be applied in alternation (expediently indirectly or essentially directly).

The preferred exemplary embodiments of the disclosure described in the figures correspond in part, wherein the same reference signs are used for similar or identical parts and reference can also be made to the description of the other exemplary embodiments for their explanation.

FIG. 1 shows an application device 100 according to an exemplary embodiment of the disclosure, wherein FIGS. **4*a* and 4*b* each show a schematic view of an application bead 200, according to an exemplary embodiment of the disclosure, that can be generated by means of the application device 100**.

The application device 100 is configured to apply an expediently mixed two-component material AB (2C material). The 2C material AB comprises a first component material A and a second component material B. The first component material A is, for example, an adhesive medium (preferably resin) and the second component material is, for example, a hardener medium for hardening the adhesive medium A. The following exemplary embodiments are described with reference to an adhesive medium A and a hardener medium B, but are not limited thereto.

The application device 100 comprises an application head H and an application nozzle 30, and a first line section 10 leading to the application nozzle 30. Preferably, the application nozzle 30 tapers towards its outlet opening. However, it can also have a substantially constant passage cross-section, for example.

The first line section 10 comprises a mixer 3 (e.g. a static or dynamic mixer) in an application tube 4 and a first line 1 for the adhesive medium A and a second line 2 for the hardener medium B. The first line 1 and the second line 2 are connected to the mixer 3 so that the mixer 3 can mix the adhesive medium A and the hardener medium B with each other for forming the mixed 2C material AB. The first line 1 and the second line 2 run partially in the application head H.

A special feature is that the application device 100 comprises a second line section 20, expediently leading to the application nozzle 30, for also the adhesive medium A (preferably resin).

The second line section 20 forms, in particular, a bypass line for bypassing the mixer 3 and can open, for example, downstream behind the mixer 3 into the application tube 4 and, in particular, into the application nozzle 30.

Consequently, the first line 1 and the second line section 20 can provide the same adhesive medium A.

Figure 4A:
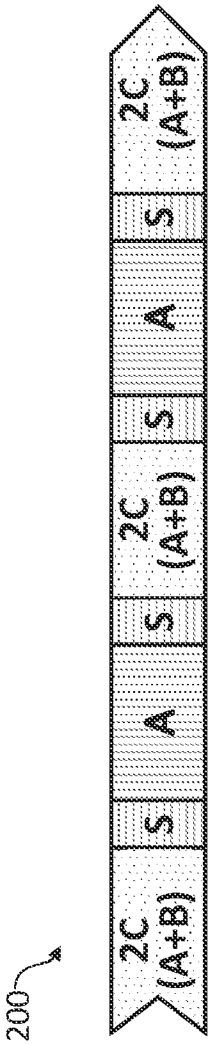
FIGS. 4*a* and 4*b* show an application bead generateable by an application device according to exemplary embodiments of the disclosure.
Figure 4B:
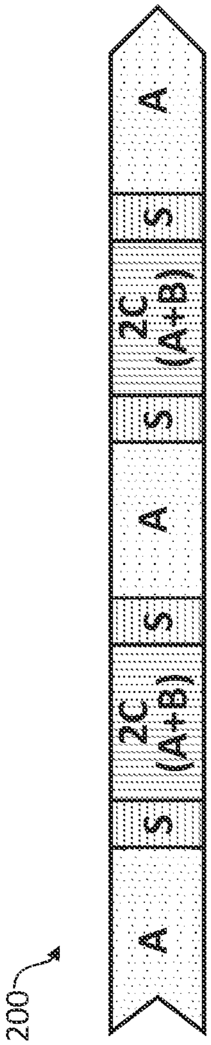

By means of the first line 1 and the second line 2, and thus in particular by means of the first line section 10, the bead sections AB can be formed from the 2C material (FIGS. 4*a* and 4*b*).

By means of the second line section 20, the bead sections A can be formed from preferably only the adhesive medium A, in particular omitting the hardener medium B (FIGS. 4*a* and 4*b*).

Thus, application beads 200 can be produced from alternately the 2C material AB from the first line section 10 and only the adhesive medium A from the second line section 20, omitting the hardener medium B (FIGS. 4*a* and 4*b*).

The application medium device 100 enables an in particular partially boosted application, wherein the A component material of the 2C material AB and the 2C material AB can be applied (expediently indirectly or substantially directly) in alternation.

The second line section 20, which is provided in addition to the first line section 10 and is also for the adhesive medium A, enables in particular application beads 200 with as small as possible, preferably essentially no undefined transition regions S (FIGS. 4*a* and 4*b*) between bead sections from 2C material AB and bead sections from preferably only adhesive medium A, in particular because a mixture from adhesive medium A and hardener medium B can always remain in the mixer 3 in the set, expediently desired mixing ratio.

Figure 3C:
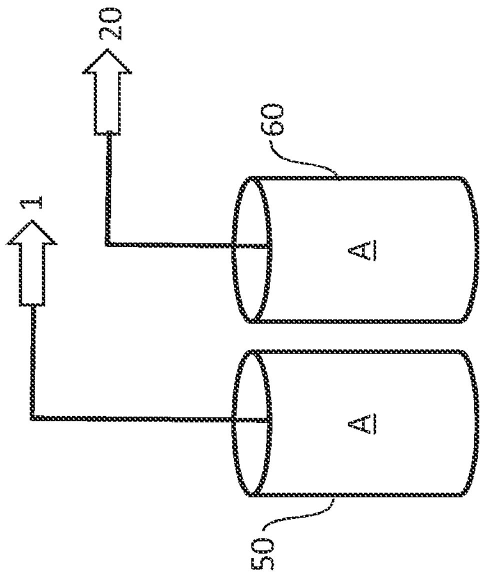
FIGS. 3*a* to 3*c* show different material supplies for an application device according to different exemplary embodiments of the disclosure.

The adhesive medium A for the first line 1 and the adhesive medium A for the second line section 20 are the same material, which can expediently be provided by a common material supply 40 (e.g. FIGS. 3*a* and 3*b*) or can be provided by different material supplies 50 and 60 (FIG. 3*c*). In particular, the material supply can comprise one or more material tanks for the adhesive medium A.

The application tube 4 comprises an outer lateral surface and an inlet-sided front side 4.1. The application nozzle 30 comprises an outer lateral surface and an inlet-sided front side 30.1.

The first line section 10 leads via the front side 4.1 into the application tube 4 and via the front side 30.1 into the application nozzle 30.1. Application can then be carried out by means of the outlet opening of the application nozzle 30.

The second line section 20 is routed past the application head H and at least for the most part past the application tube 4. The second line section 20 extends outside the application tube 4 and leads, in particular, from laterally outside via the lateral surface of the application nozzle 30 into the application nozzle 30. Application can then be carried out via the outlet opening of the application nozzle 30.

The first line section 10 and the second line section 20 can thus open into the common application nozzle 30.

The first line 1 can comprise an own (first) metering device D1 to meter the adhesive medium A for the first line 1. The second line section 20 can also comprise an own (second) metering device D2 to meter the adhesive medium A for the second line section 20. However, a common metering device D can also be provided (e.g. FIG. 2) to meter the adhesive medium A for both the first line 1 and the second line section 20.

The second line 2 can also include a metering device D3 to meter the hardener medium B.

The application tube 4 with the mixer 3 preferably comprises a mounting structure for detachable mounting to the application head H.

The first line 1 and the second line 2 are integrated partially in the application head H and thus run in the application head H. Also integrated in the application head H is a first valve V1 (e.g. a needle valve) for opening and closing the first line 1 and a second valve V3 (e.g. a needle valve) for opening and closing the second line 2.

The second line section 20, however, is preferably routed past the application head H and, in particular, past the mixer 3.

The second line section 20 can comprise one or more optional valves V2, for example a non-return valve and/or a preferably controllable valve, for opening and closing the second line section 20.

The application nozzle 30 and the mixer 3 and/or the application tube 4 are preferably substantially coaxially aligned with each other. However, the second line section 20 connects to the application tube 4 and/or the application nozzle 30 preferably obliquely or laterally and thus, in particular, not coaxially.

In order to ensure a continuous material flow expediently downstream of the application nozzle 30 during a switchover from 2C material AB to the A component, the metering of the 2C material AB can be decreased, and simultaneously the metering of the A component can be increased. If the switchover is not required during running application, but is only needed, for example, when changing from one adhesive bead to the next adhesive bead, the A component can also be metered from, for example, one and the same metering device. An additional metering is then not required.

The application device 100 can be used in particular in vehicle bodyshell work. Here, by changing the application media during the application, areas can be applied which can expediently be thermally hardened quickly by, for example, induction or infrared radiation. In this way, sufficient handling strength can be achieved and/or alternative costly tacking processes can be avoided.

Figure 2:
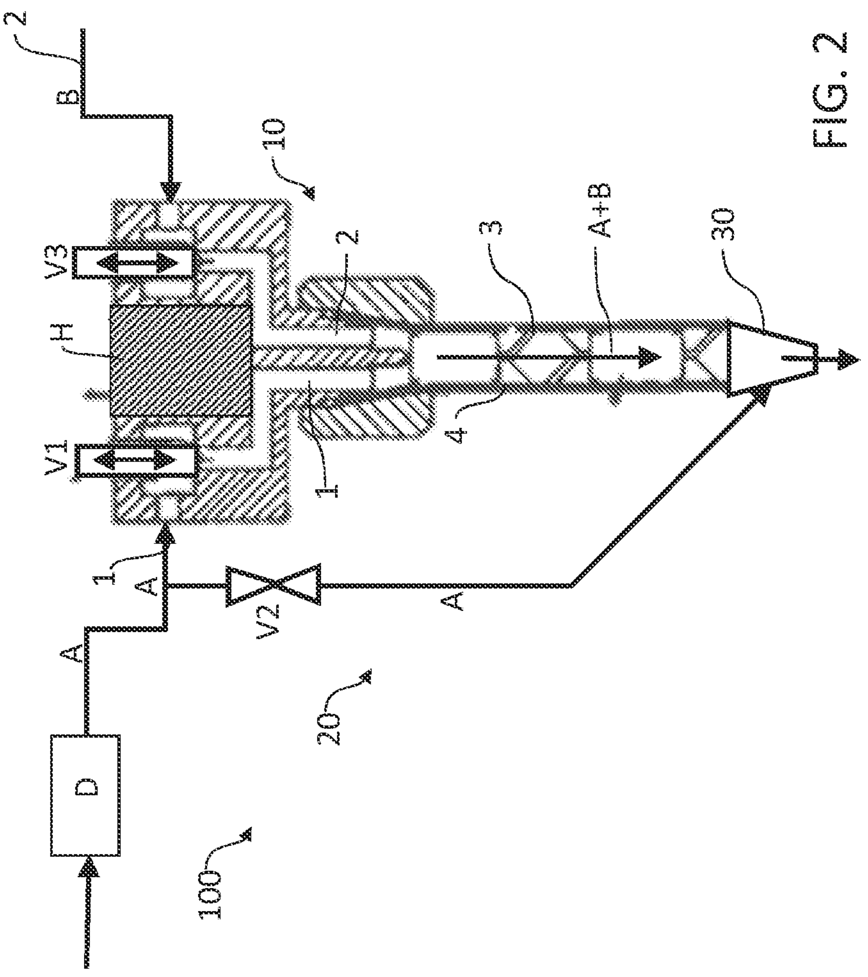
FIG. 2 shows an application device according to another exemplary embodiment of the disclosure.

FIG. 2 shows an application device 100 according to another exemplary embodiment of the disclosure, with which, for example, also application beads 200, as shown schematically in FIGS. 4*a* and 4*b*, can be produced.

A special feature is that the adhesive medium A can be metered from a common metering device D both for the line 1 and for the second line section 20.

Figure 3B:
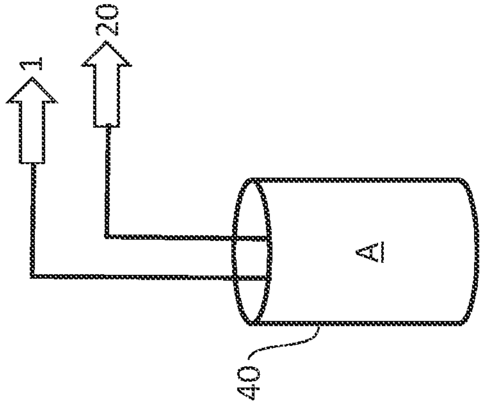
Figure 3A:
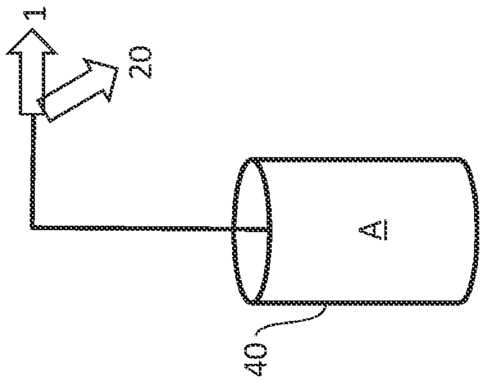

FIGS. 3*a* to 3*b* show different material supplies for an application device 100 according to different exemplary embodiments of the disclosure.

FIG. 3*a* shows an exemplary embodiment of a common material supply 40 for the adhesive medium A, e.g. a tank for the adhesive medium A. The material supply 40 serves to provide the adhesive medium A both for the line 1 and for the second line section 20.

FIG. 3*b* shows another exemplary embodiment of a common material supply 40 for the adhesive medium A, e.g. a tank for the adhesive medium A. The material supply 40 serves to provide the adhesive medium A both for the line 1 and for the second line section 20.

FIG. 3*c* shows an exemplary embodiment with two material supplies 50 and 60 for the adhesive medium A, e.g. two tanks for the adhesive medium A. The first material supply 50 is used to provide the adhesive medium A for the first line 1. The second material supply 60 serves to provide the adhesive medium A for the second line section 20.

FIGS. 4*a* and 4*b* show application beads 200, that can be generated by an application device 100, according to different exemplary embodiments of the disclosure.

The application bead 200 comprises (expediently indirectly or at least substantially directly) alternating bead sections AB from the 2C material AB (adhesive medium and hardener medium) and bead sections A from the adhesive medium A, omitting the hardener medium B. The second line section 20, provided in addition to the first line section 10, in particular in addition to the first line 1, for also the adhesive medium A, enables in particular as small as possible, preferably essentially no undefined transition regions S between bead sections AB from 2C material (A+B) and bead sections A from preferably only the adhesive medium A, in particular because a mixture from adhesive medium A and hardener medium B can always remain in the mixer 3 in the set, expediently desired mixing ratio. The disclosure is preferably not limited to the sequence between bead sections from the 2C material AB and bead sections from the first component material A.

Figure 5:
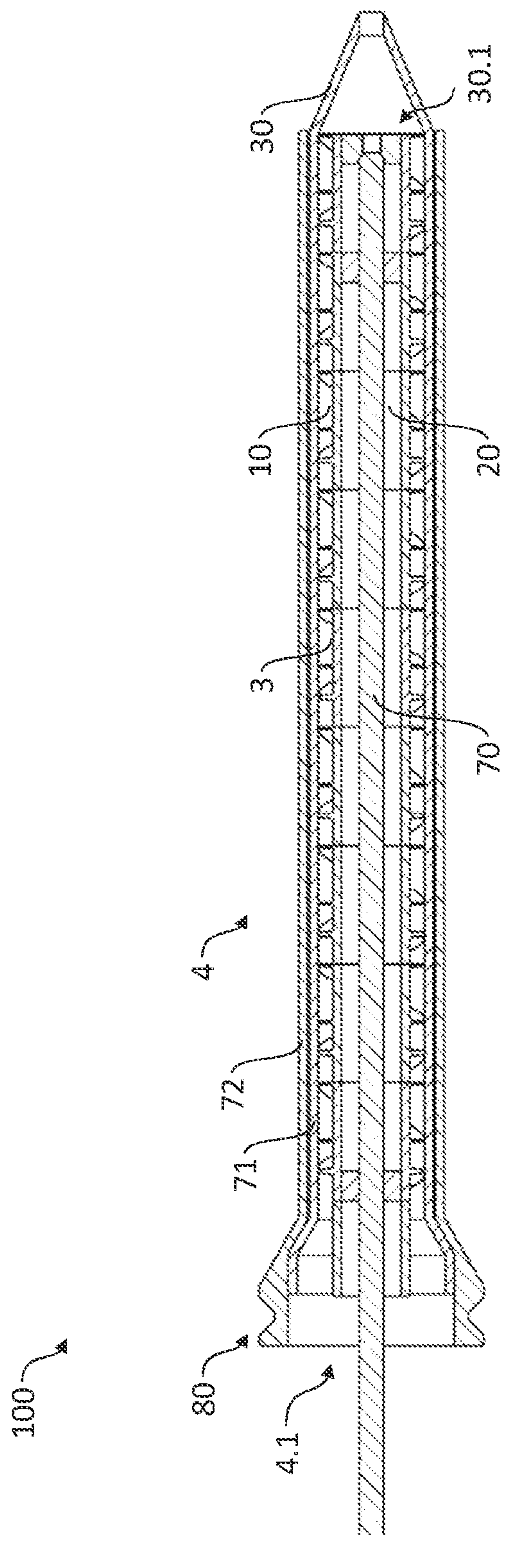
FIG. 5 shows a sectional view of an application device, in particular an application tube according to an exemplary embodiment of the disclosure.

FIG. 5 shows a longitudinal section of an application device 100, in particular an application tube 4 according to an exemplary embodiment of the disclosure.

A mixer 3 with an external mixer contour is arranged in the application tube 4. The application tube 4 comprises inlet-sided a mounting structure 80 for detachable mounting to the applicator head H and outlet-sided the application nozzle 30.

A special feature is that the second line section 20 and the first line section 10 extend (in particular coaxially) through the application tube 4 and open into the application nozzle 30 via a front side 30.1 of the application nozzle 30.

The second line section 20 can thus extend (e.g. axially) along the mixer 3 and be arranged parallel to the first line section 10.

The mixer 3 comprises an expediently radially outer mixer contour for the first line section 10 and an expediently radially inner hollow channel for the second line section 20 and preferably a valve needle 70.

In the embodiment shown in FIG. 5, the second line section 20 runs radially inside the mixer 3 and thus radially inside the first line section 10, in particular between the mixer 3 and the valve needle 70. The mixer 3 thus forms a hollow channel (e.g. a hollow shaft) for the second line section 20 and the valve needle 70. The first component material A can be fed to the application nozzle 30 inside the mixer 3 and thus in the hollow channel, wherein the 2C material AB can be fed to the application nozzle 30 via the external mixer contour of the mixer 3.

However, embodiments are also possible in which in the application tube 4 the second line section 20 runs radially outside the mixer 3 and thus radially outside the first line section 10.

The application tube 4 comprises an outer lateral surface and an inlet-sided front side 4.1. The application nozzle 30 comprises an outer lateral surface and an inlet-sided front side 30.1.

The first line section 10 leads via the front side 4.1 into the application tube 4 and via the front side 30.1 into the application nozzle 30.1. Application can then be carried out by means of the outlet opening of the application nozzle 30.

The second line section 20 also leads via the front side 4.1 into the application tube 4 and via the front side 30.1 into the application nozzle 30.1. Application can then be carried out via the outlet opening of the application nozzle 30.

The first line section 10 and the second line section 20 can thus end in the common application nozzle 30.

In the embodiment shown in FIG. 5, not only the first line section 10, but preferably also the second line section 20 can run in the application head H and thus be introduced into the application tube 4, in particular via the application head H.

The valve needle 70 arranged in the mixer 3 preferably extends into the outlet-sided end section of the application tube 4, in particular into the last fifth or sixth of the application tube 4, e.g. until substantially directly before the application nozzle 30 or into the application nozzle 30. The valve needle 70 can be inlet-sided switched (e.g. actuated) and outlet-sided close, for example. The valve needle 70 serves to open or close the second line section 20.

In the application tube 4, and in particular in the hollow channel of the mixer 3, two axially spaced-apart bearing locations for the valve needle 70 are arranged, wherein the second line section 20 is guided through the two bearing locations, so that the first component material A for the second line section 20 can flow through one or more openings in the bearing locations through the bearing locations to the application nozzle 30.

The application tube 4 can include an expediently inner tube 71 in which the mixer 3 can be formed. The tube 71 can, for example, be a one-piece integral part of the mixer 3, wherein it is also possible that the mixer 3 is detachably or fixedly mounted within the tube 71.

The application tube 4 can comprise an optional tube, in particular a protective tube 72, wherein the protective tube 72 can externally cover the tube 71. It is possible, for example, that the mixer 3 and/or the tube 71 is detachably accommodated (e.g., clamped) in the protective tube 72 so that the mixer 3 can be replaced if necessary.

Figures 6A, 6B, 6C:
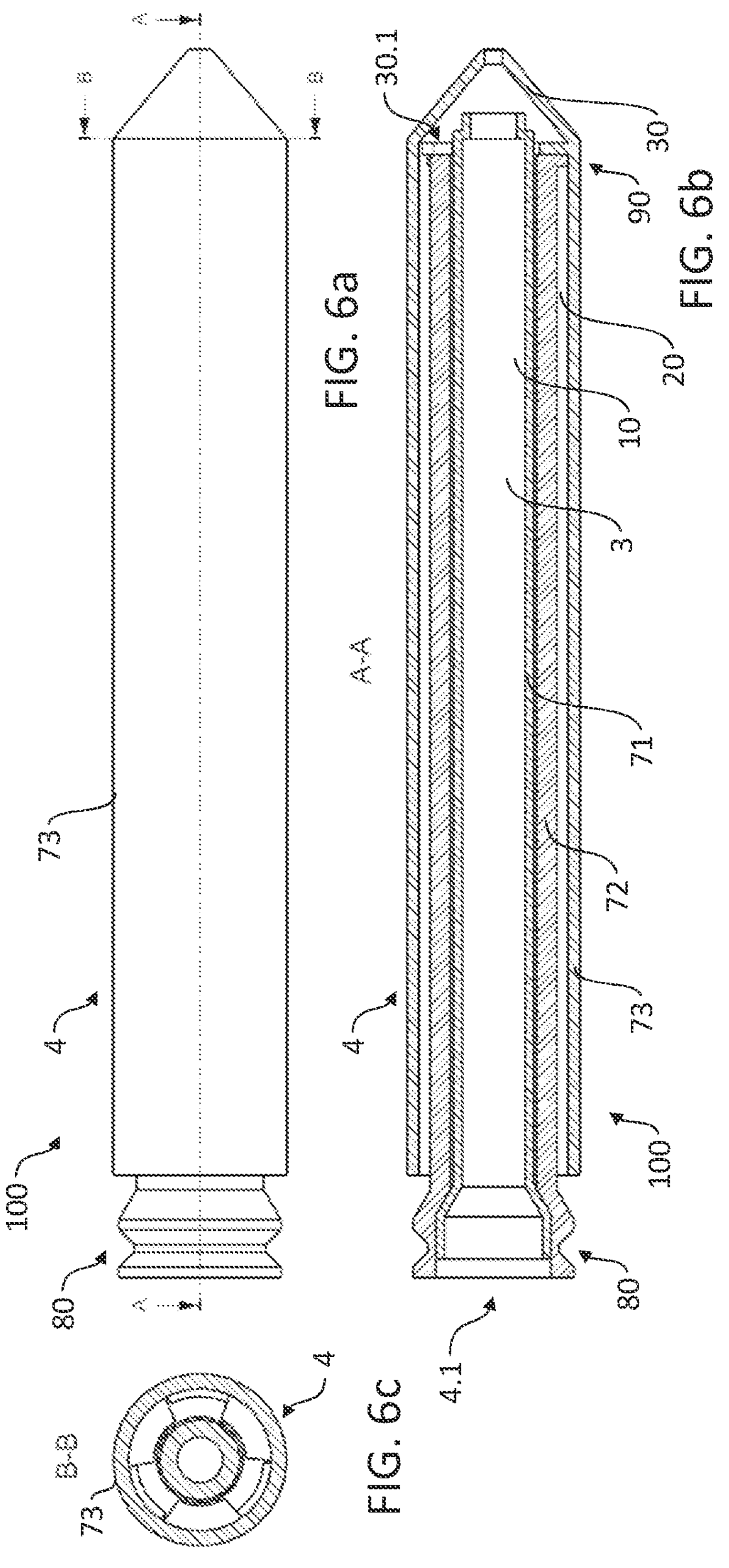
FIGS. 6*a* to 6*c* show different views of an application device, in particular an application tube according to another exemplary embodiment of the disclosure.

FIGS. 6*a* to 6*c* show different views of an application device 100, in particular an application tube 4 according to another exemplary embodiment of the disclosure.

FIG. 6*b* shows a section along line A-A in FIG. 6*a*, wherein FIG. 6*c* shows a section along line B-B in FIG. 6*a*.

The mixer 3 and the valve needle 70 are arranged in the application tube 4, but are not shown in FIGS. 6*a* to 6*c* for illustration purposes.

The first line section 10 and the second line section 20 extend through the application tube 4 and open in the application nozzle 30.

The application tube 4 comprises a tube 71 in which the mixer 3 is arranged. The tube 71 is externally covered by an optional tube, in particular protective tube 72.

The application tube 4 comprises, in particular outlet-sided, a rotary closure 90, by means of which, in particular, the second line section 20 can be opened or closed.

To form the rotary closure 90, the application tube 4 can comprise a rotatable tube 73, which preferably covers the tube 71 and/or the protective tube 72 laterally on the outside and is rotatable relative to the tube 71 and/or the protective tube 72. An e.g. electric motor or pneumatic drive can be provided to rotate the rotatable tube 73.

Similar to the embodiment shown in FIG. 5, the first line section 10 leads via the front side 4.1 into the application tube 4 and via the front side 30.1 into the application nozzle 30.1. Application can then be carried out by means of the outlet opening of the application nozzle 30.

Similar to the embodiment shown in FIG. 5, the second line section 20 also leads via the front side 4.1 into the application tube 4 and via the front side 30.1 into the application nozzle 30.1. Application can then be carried out via the outlet opening of the application nozzle 30.

However, in the embodiment shown in FIGS. 6*a* to 6*c*, the second line section 20 in the application tube 4 runs outside the mixer 3 and thus in particular outside the first line section 10. The second line section 20 extends in particular between the tube 71 and/or the protective tube 72 and the tube 73.

The embodiments shown in FIGS. 5 and 6*a* to 6*c* enable in particular a narrow construction.

The application device 100 enables in particular one or more of the following advantages, for example:

- Very dynamic switching between the application of mixed 2C material (A+B) and the pure A component.
- Switching can take place almost without transition, wherein e.g. a very small transition region with undefined mixed material can be achieved, which only corresponds to the material volume, which is located between the introduction of the A-components and the nozzle outlet.
- In mixer 3, a material volume can be ensured which can always correspond to the desired mixing ratio. Thus, for example, the pot life is always essentially the same, and can be expediently tracked error-free in the system. Flushing processes of the mixed 2C material that may be required can be started in a targeted manner, e.g. when the plant is at a standstill. As a result, the amount of material to be discarded can be reduced to a minimum.
- Precise process control is possible.
- Use with both dynamic and static mixers is possible.
- If no switchover is required during the application, it is also possible to realize applications with only 2C material AB or only with the A component.

The disclosure is not limited to the preferred exemplary embodiments described above. Rather, a large number of variants and modifications are possible which also make use of the inventive concept and therefore fall within the scope of protection. In addition, the disclosure also claims protection for the subject matter and features of the sub-claims independently of the referenced features and claims.

The invention claimed is:

1. An application device for alternately applying a 2C material, comprising:

an application head, a first line section leading to an application nozzle, wherein the first line section comprises a mixer and a first line for a first component material and a second line for a second component material, wherein the first line and the second line are connected to the mixer and the mixer mixes the first component material and the second component material with each other for forming a 2C material, and a second line section for the first component material to form an application bead of alternately the 2C material from the first line section and the first component material from the second line section, wherein the first line comprises a controllable valve for opening or closing the first line and the second line comprises a controllable valve for opening or closing the second line and the first valve and the second valve are integrated in the application head before the mixer, and wherein the application device comprises an application tube, wherein the mixer is arranged in the application tube and the second line section runs coaxially through the application tube along an entire length of the application tube.

2. The application device according to claim 1, characterized in that the second line section forms a bypass line for bypassing the mixer and/or leads downstream of the mixer to the application nozzle.

3. The application device according to claim 2, characterized in that the application device is configured for alternately applying the 2C material on the one hand and the first component material omitting the second component material on the other hand, and/or the second line section leads the first component material to the application nozzle omitting the second component material.

4. The application device according to claim 1 characterized in that the second line section leads to the application nozzle, opens into the application nozzle and/or opens directly before the application nozzle.

5. The application device according to claim 1, characterized in that the first line is connected to a first metering device, wherein the first metering device meters the first component material for the first line, and the second line section is connected to a second metering device, wherein the second metering device meters the first component material for the second line section.

6. The application device according to claim 1 characterized in that a common metering device is provided to meter the first component material for the first line and the first component material for the second line section.

7. The application device according to claim 1 characterized in that the first component material for the first line is provided by a first material supply and the first component material for the second line section is provided by a second material supply.

8. The application device according to claim 1 characterized in that a common material supply is provided to provide the first component material for the first line section and the first component material for the second line section.

9. The application device according to claim 1 characterized in that the mixer is configured as a static mixer or dynamic mixer.

10. The application device according to claim 1, characterized in that the second line section comprises at least one valve, a non-return valve and/or a controllable valve for opening or closing the second line section.

11. The application device according to claim 1, characterized in that the second line section extends along the mixer, is arranged parallel to the first line section and/or is arranged coaxially to the first line section.

12. The application device according to claim 11, characterized in that the second line section extends in the application tube inside or outside the mixer.

13. The application device according to claim 1 characterized in that the first line section and/or the second line section is openable or closable by a rotary closure and the application tube comprises the rotary closure.

14. The application device according to claim 13, characterized in that the application tube is formed multi-tubed.

15. The application device according to claim 14, characterized in that the application tube comprises at least two tubes between which the second line section runs and/or of which at least one tube is rotatable to open or close the first line section and/or the second line section and thus to form a rotary closure.

16. The application device according to claim 15, characterized in that the rotary closure is arranged in the outlet-sided end portion of the application tube.

17. The application device according to claim 16, characterized in that a valve needle running coaxially to the application tube is arranged in the application tube and the valve needle extends into the outlet-sided end section of the application tube.

18. The application device according to claim 17, characterized in that the first line section and the second line section are separated from each other in the application tube by a double wall.

19. The application device according to claim 1 characterized in that the first line and/or the second line runs in the application head.

20. The application device according to claim 1 characterized in that the second line section runs in the application head or is guided past the application head.

21. The application device according to claim 1 characterized in that the first line section leads into the application tube via a front side of the application tube, and the second line section leads into the application tube via the front side of the application tube, leads into the application tube via a lateral surface of the application tube or leads into the application nozzle via a lateral surface of the application nozzle.

22. The application device according to claim 1 characterized in that the first line section and the second line section lead into the application nozzle via a front side of the application nozzle.

23. The application device according to claim 1 characterized in that the first component material is an adhesive medium, the first line is an adhesive medium line, the second line section is an adhesive medium line section, and the second component material is a hardener medium, wherein the second line is a hardener medium line, and the application bead is an adhesive bead.

24. The application device according to claim 1 characterized in that the first component material of the first line and the first component material of the second line section is the same material.

25. The application device according to claim 1 characterized in that the mixer and/or the application tube comprises a mounting structure for detachable mounting to the application head.

26. The application device according to claim 1 characterized in that the application device comprises a first hardening means for hardening application bead sections from the 2C material and/or a second hardening means for hardening application bead sections from the first component material.

27. The application device according to claim 26, characterized in that the first hardening means is configured for hardening by means of induction or by means of infrared radiation and/or the second hardening means comprises a hardening oven.

28. An application device for alternately applying a 2C material, comprising:

an application head;

a first line section leading to an application nozzle, wherein the first line section comprises a mixer and a first line for a first component material and a second line for a second component material, wherein the first line and the second line are connected to the mixer and the mixer mixes the first component material and the second component material with each other for forming a 2C material;

a second line section for the first component material to form an application bead of alternately the 2C material from the first line section and the first component material from the second line section; and wherein the second line section and the first line section runs through an application tube and are separated from each other in the application tube by a double wall; and wherein the first line comprises a controllable valve for opening or closing the first line and the second line comprises a controllable valve for opening or closing the second line and the first valve and the second valve are integrated in the application head before the mixer.

* * * * *